(12) United States Patent
Kuenzner et al.

(10) Patent No.: US 8,731,818 B2
(45) Date of Patent: May 20, 2014

(54) NAVIGATION SYSTEM FOR MOTOR VEHICLES

(75) Inventors: Hermann Kuenzner, Freising (DE); Armin Distler, Munich (DE); Wilfried Steins, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 135 days.

(21) Appl. No.: 12/983,521

(22) Filed: Jan. 3, 2011

(65) Prior Publication Data

US 2011/0130961 A1    Jun. 2, 2011

Related U.S. Application Data

(63) Continuation of application No. PCT/EP2009/004239, filed on Jun. 12, 2009.

(30) Foreign Application Priority Data

Jul. 4, 2008  (DE) .......................... 10 2008 031 717

(51) Int. Cl.
*G01C 21/36* (2006.01)
(52) U.S. Cl.
USPC ........... 701/410; 701/411; 701/412; 701/413; 340/901; 340/994; 342/457
(58) Field of Classification Search
USPC .................... 701/201; 340/901, 994; 342/457
See application file for complete search history.

(56) References Cited

U.S. PATENT DOCUMENTS

| 5,699,056 A * | 12/1997 | Yoshida ....................... 340/905 |
| 6,381,534 B2 * | 4/2002 | Takayama et al. ............ 701/465 |
| 7,064,681 B2 * | 6/2006 | Horstemeyer ................ 340/994 |
| 7,504,966 B2 * | 3/2009 | Horstemeyer ................ 340/994 |
| 7,889,101 B2 * | 2/2011 | Yokota ..................... 340/995.19 |
| 2004/0151388 A1 * | 8/2004 | Maeda .......................... 382/232 |
| 2007/0052586 A1 * | 3/2007 | Horstemeyer ................ 342/457 |
| 2010/0026526 A1 * | 2/2010 | Yokota ........................ 340/996 |
| 2011/0130961 A1 * | 6/2011 | Kuenzner et al. ............ 701/201 |
| 2012/0044089 A1 * | 2/2012 | Yarnold et al. ............... 340/901 |

FOREIGN PATENT DOCUMENTS

| JP | 6-110384 A | 4/1994 |
| JP | 9-292831 A | 11/1997 |
| JP | 2000-231328 A | 8/2000 |

OTHER PUBLICATIONS

International Search Report dated Oct. 2, 2009 with English translation (four (4) pages).

* cited by examiner

*Primary Examiner* — Thomas Black
*Assistant Examiner* — Wae Louie
(74) *Attorney, Agent, or Firm* — Crowell & Moring LLP

(57) ABSTRACT

A navigation system for motor vehicles includes a receiving unit for receiving traffic messages to which a location information object is in each case assigned. A display unit for displaying a digital road map and a control unit. The control unit is coupled to the receiving unit and the display unit, and is operatively configured such that cutouts of a digital road map to which the traffic messages relate are successively displayed of the display.

19 Claims, 1 Drawing Sheet

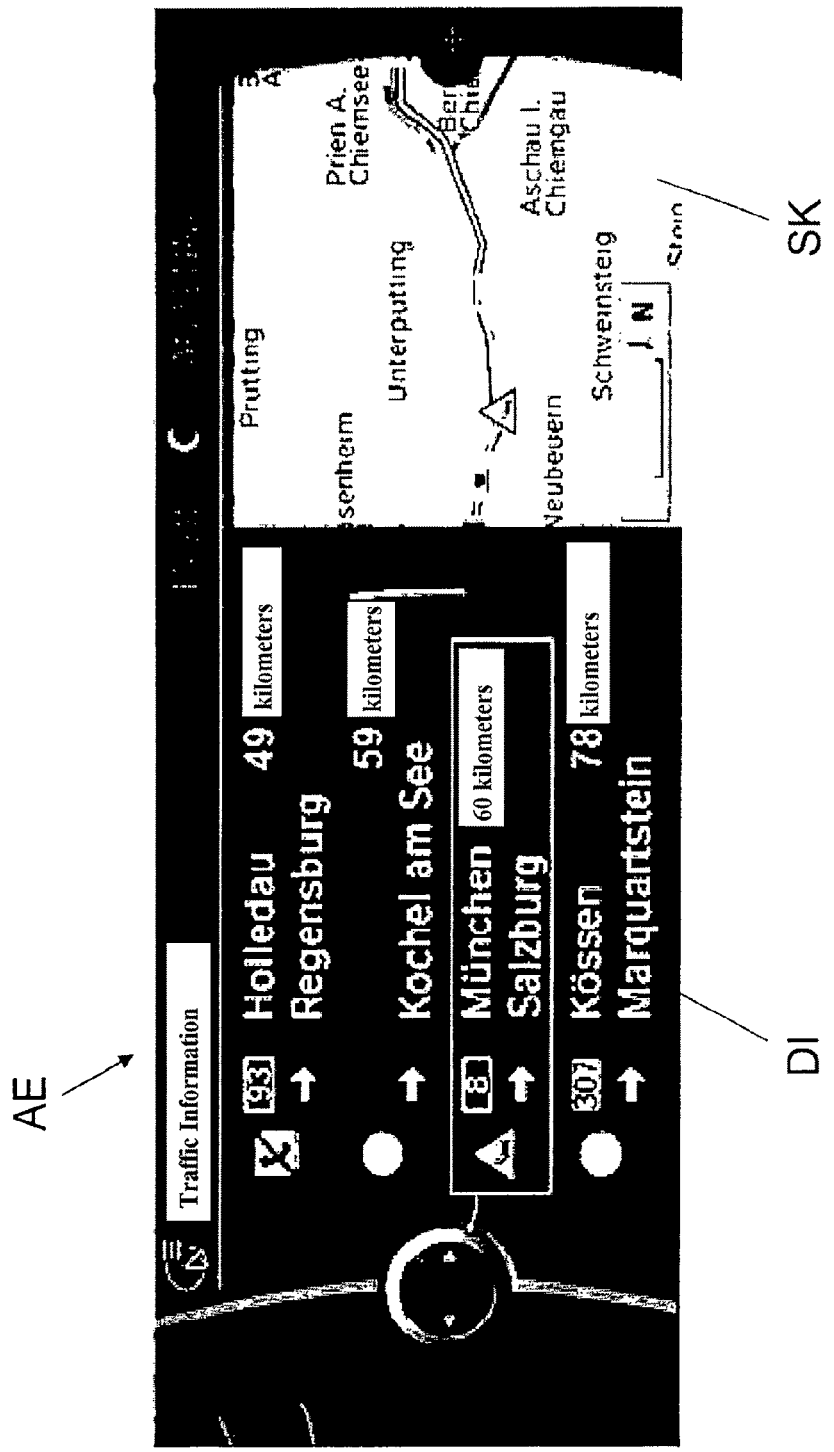

NAVIGATION SYSTEM FOR MOTOR VEHICLES

CROSS-REFERENCE TO RELATED APPLICATIONS

This application is a continuation of PCT International Application No. PCT/EP2009/004239, filed Jun. 12, 2009, which claims priority under 35 U.S.C. §119 from German Patent Application No. DE 10 2008 031 717.9, filed Jul. 4, 2008, the entire disclosures of which are herein expressly incorporated by reference.

BACKGROUND AND SUMMARY OF THE INVENTION

The invention relates to a navigation system for motor vehicles.

Navigation systems permit the computing of a route between a starting point and a destination point. In this case, it is known to receive traffic messages reporting traffic interruptions or delays and to display these traffic messages in the form of a list or to superimpose corresponding symbols on the display of a digital road map.

It was found to be a disadvantage here that, when displaying the digital map on a small scale, i.e. the display covers a smaller area, traffic interruptions farther from the current location cannot be displayed on the map display. When the display of the digital map takes place on a large scale, i.e. the display covers a larger area, so many symbols are displayed on the road map display that a user will lose track. In addition, the precise location, the type and the severity of the traffic interruptions can then frequently no longer be detected.

It is now an object of the invention to provide an improved navigation system for a motor vehicle.

A navigation system for motor vehicles according to the invention includes a receiving unit for receiving traffic messages having a respective location information object assigned to it, such as location coordinates, and/or a geographical area and/or a road section. A digital road map can be displayed at least in cutouts on a display unit, such as a graphic display. A control unit, which may also include a traffic message storage device, is coupled with the receiving unit and the display unit and is designed with respect to the hardware and/or programs such that the cutouts of a digital road map to which the traffic messages relate are displayed successively, particularly directly successively. Other road sections or cutouts of a digital road map, particularly those situated in-between and/or not having traffic interruptions are not displayed in-between.

As a result, it is achieved that, also in the event of traffic interruptions occurring far away from one another, the driver will be informed of these traffic interruptions in a comfortable, fast, comprehensive and clear manner. These advantages are further enhanced by means of the following further developments.

Preferably, the cutouts of a digital road map that are determined by the location information objects assigned to the traffic information are displayed successively. For example, only those cutouts are displayed which include the road sections having traffic interruptions.

The scale of the display of the cutout of the digital road map is preferably automatically set such that the road section having the traffic interruption to which the traffic message relates is completely displayed.

Particularly preferably, it is provided that, beside the cutouts of a digital road map which are successively displayed, particularly in a preview area, and to which the traffic messages relate, particularly in a traffic reporting area, detail information objects in each case assigned to the traffic messages are displayed on the display unit, such as location information, information concerning the time delay connected with the traffic interruption, a street name, a cause of a traffic interruption, a type of traffic interruption and/or a length of the traffic interruption. The detail information objects of several traffic messages can be simultaneously displayed, for example, in the form of a list, such as a traffic reporting list known per se. All list entries, some list entries, or in each case only one list entry, may be displayed simultaneously.

According to a further aspect of the invention, a detail information object can be marked by an operating action, for example, by pushing a key or rotating a rotary element. By a marking of a detail information object, the corresponding cutout of a digital road map is displayed which, in particular, is assigned to the corresponding traffic message. A display of additional information concerning the detail information object is preferably connected with the marking of a detail information object. This display may be limited with respect to time and/or may be superimposed on or may cover the display of other detail information objects.

It is preferably provided that, by way of successive identical operating actions, a browsing takes place through the cutouts of a digital road map to which the traffic messages relate.

Beside the cutouts of a digital road map, which are successively displayed in a preview area and to which the traffic messages relate, on a first scale, a further cutout (overview cutout) of the digital road map on a second scale is displayed on the display unit, the first scale (for example, 1:500) being smaller than the second scale (for example, 1:1,000). The reduction of the first display is therefore not as strong as the reduction of the second display. As an alternative or in addition, the first scale can automatically be selected corresponding to the geographical expansion of the traffic interruption described by the traffic report such that the region affected by the traffic interruption is displayed completely or as a predefined portion.

The area which corresponds to the cutout of the road map displayed in the preview area can, in each case, be displayed to be marked or highlighted in the overview cutout.

As a further development, symbols assigned to the traffic messages can be displayed by superimposing them on the further cutout (overview cutout).

It is particularly preferably provided to only or preferably display detail information objects and/or cutouts of a digital road map concerning traffic messages related to a current route. In particular, within the scope of the invention, the term "traffic messages" relates to traffic messages situated on or relating to the current route, for example, determined by the navigation system.

Preferably, that cutout of a digital road map is automatically always displayed to which the next traffic message relates which is situated on the current route. As soon as this region or the corresponding road section has been completely or partially passed, that cutout of the digital road map will be displayed to which the next traffic message relates that is situated on the current route.

The invention especially includes a navigation system for motor vehicles which is designed such that a list of location-based information objects, particularly traffic messages, sights, points of interest, addresses (for example, from an address book, a telephone book or a list of Internet search results) and/or last-selected destinations is displayed in a first display area, that the cutout of a digital road map to which the location-based information object relates is displayed in a second, particularly adjacent display area, and that a browsing takes place by successive, particularly essentially identical operating actions through the cutouts of the digital road map to which the location-based information objects relate. All list entries, some list entries or in each case only one list entry may be displayed simultaneously. Thus, the browsing takes place through the cutouts of the digital road map which each contain the geographical location or area to which the location-based information object relates or which is assigned to the location-based information object. Preferably, a successive marking of the corresponding location-based information objects is connected with the browsing through cutouts of the digital road map to which the location-based information objects relate.

Combinations of the last-mentioned navigation system for motor vehicles and the above-mentioned further developments and preferred embodiments are also within the scope of the invention.

Other objects, advantages and novel features of the present invention will become apparent from the following detailed description of one or more preferred embodiments when considered in conjunction with the accompanying drawings.

BRIEF DESCRIPTION OF THE DRAWING

FIG. 1 is a view of a display of traffic-message-related information on the display unit of a navigation system.

DETAILED DESCRIPTION OF THE DRAWING

A navigation system for motor vehicles that is known per se, and is capable of receiving traffic messages. A traffic message includes a location information object, such as information concerning the location of a traffic interruption, and at least one detail information object, such as information concerning the type of the traffic interruption. In this case, the location information object can also be part of the detail information object.

FIG. 1 illustrates an exemplary display AE of a navigation system for motor vehicles in accordance with the invention. On the right-hand side, a cutout of a digital road map SK is displayed in a preview area. This cutout relates to a current received and/or intermediately stored traffic message. The displayed cutout is a result of the location information object and/or detail information object assigned to the traffic message.

Beside the preview area, several detail information objects DI of different traffic messages are simultaneously displayed on the left-hand side in the form of a list. By means of one or more operating actions, a detail information object, as, for example, here the framed detail information object can be marked which relates to a traffic interruption on road A8 between München and Salzburg. By the marking of this detail information object, the corresponding cutout of the digital road map affected by this traffic interruption is automatically displayed on the right-hand side of the display AE.

By way of successive identical operating actions, for example, the rotating of a rotary element about a predefined angle, a scrolling can take place through the list of detail information objects DI, or one detail information object after another (or one traffic message after another) can be marked or selected, and thus a browsing can automatically take place through the cutouts of the digital road map to which the detail information objects or traffic messages relate.

As an alternative to the list display of the detail information objects or traffic messages, it is provided to display an overview cutout of the digital road map in addition to the cutouts of a digital road map which are successively displayed in a preview area and to which the traffic messages relate. For the purpose of improved clarity, this display of the overview cutout takes place at a scale larger than that of the display of the road map cutouts in the right-hand preview area.

In this case, several symbol displays assigned to the traffic messages can simultaneously be superimposed in a manner known per se on the display of the overview cutout.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A navigation system for a motor vehicle, comprising:
a receiving unit operatively configured to receive traffic messages to which a location information object is in each case assigned, wherein the location information objects each include a location of a corresponding traffic interruption;
a display unit, in the motor vehicle, for displaying a digital road map; and
a control unit operatively coupled to the receiving unit and the display unit;
wherein the control unit controls a successive displaying on to the display unit of cutouts of the digital road map to which the received traffic messages relate based on corresponding successive operating actions received by the control unit from an operator of the motor vehicle thereby causing a browsing through the cutouts of the digital road map to which the received traffic messages relate, wherein each of the cutouts displayed by said browsing corresponds to one of the locations having the traffic interruptions.

2. The navigation system according to claim 1, wherein the successively displayed cutouts of the digital road map are determined by the location information objects assigned to the received traffic messages.

3. The navigation system according to claim 1, wherein the control unit operates to also display detail information objects in each case assigned to the received traffic messages in addition to the successively displayed cutouts.

4. The navigation system according to claim 3, wherein the successively displayed cutouts are displayed in a preview area of the display unit.

5. The navigation system according to claim 3, wherein the detail information objects of several received traffic messages are displayed simultaneously in list form on the display unit.

6. The navigation system according to claim 4, wherein the detail information objects of several received traffic messages are displayed simultaneously in list form on the display unit.

7. The navigation system according to claim 3, wherein the control unit is operatively configured to mark a detail information object upon receipt of an operating action; and
wherein a cutout of the digital road map corresponding to the marking is displayed on the display unit.

8. The navigation system according to claim 3, wherein the control unit is operatively configured to display only detail information objects and/or cutouts of the digital road map concerning received traffic messages relating to a current route of the vehicle.

9. The navigation system according to claim 8, wherein the cutout of the digital road map is automatically displayed to which a next traffic message relates that is situated on the current route of the vehicle.

10. The navigation system according to claim 1, wherein the successively displayed cutouts of the digital road map to which the received traffic messages relate are displayed in a preview area of the display unit on a first scale; and
wherein a further cutout of the digital road map on a second scale is displayed on the display unit, the first scale being smaller than the second scale.

11. The navigation system according to claim 10, wherein symbols assigned to the received traffic messages are displayed by superimposing the symbols on the further cutout.

12. A navigation system for a motor vehicle, comprising:
a display unit, in the motor vehicle, having a first display area in which a list of at least one of location-based information objects, sights, points of interests, addresses and selected destinations are displayable;
a second display area of the display unit for displaying a cutout of a digital road map to which the location-based information objects relate, wherein the location-based information objects each include a location of a corresponding traffic interruption; and
a control unit, in the motor vehicle, operatively configured to receive successive operating actions by an operator of the motor vehicle and, in response, cause a corresponding browsing through successive cutouts of the digital road map to which the location-based information objects relate, wherein each of the cutouts displayed by said browsing corresponds to one of the locations having the traffic interruptions.

13. The navigation system according to claim 12, wherein a successive marking of the corresponding location-based information objects is connected with the browsing through the cutouts of the digital road map to which the location-based information objects relate.

14. A method of displaying road map information using a vehicle navigation system in a motor vehicle, the method comprising the acts of:
receiving, by the vehicle navigation system, one or more traffic messages to which, in each case, a location information object is assigned, wherein the location-based information objects each include a location of a corresponding traffic interruption; and
displaying, by the vehicle navigation system, in succession cutouts of a digital road map to which the received traffic messages relate in response to corresponding successive operating actions by an operator thereby cause a browsing through the cutouts of the digital road map to which the received traffic messages relate, wherein each of the cutouts displayed by said browsing corresponds to one of the locations having the traffic interruptions.

15. The method according to claim 14, wherein the displaying act further comprises the act of determining the cutouts of the digital road map to be displayed in succession based upon the location information objects assigned to the received traffic messages.

16. The method according to claim 14, further comprising the act of:
displaying detail information objects in each case assigned to the received traffic messages.

17. The method according to claim 16, wherein the detail information objects of several received traffic messages are simultaneously displayed in a list form.

18. The method according to claim 17, further comprising the acts of:
receiving an operating action causing a marking of a detail information object; and
displaying a cutout of the digital road map corresponding to the marked detail information object.

19. The method according to claim 14, wherein the cutouts of the digital road map displayed in succession and to which the received traffic messages relate are displayed in a preview area on a first scale, and further wherein a further cutout of the digital road map on a second scale is displayed, the first scale being smaller than the second scale.

* * * * *